(12) United States Patent
Serghine et al.

(10) Patent No.: US 12,424,913 B2
(45) Date of Patent: Sep. 23, 2025

(54) AIRCRAFT ELECTRICAL MACHINE WITH IMPROVED HEAT TRANSFER BY MEANS OF A PHASE CHANGE MATERIAL AND ASSOCIATED METHOD

(71) Applicants: SAFRAN HELICOPTER ENGINES, Bordes (FR); SAFRAN, Paris (FR)

(72) Inventors: Camel Serghine, Moissy-Cramayel (FR); Thomas Klonowski, Moissy-Cramayel (FR); Pierre Gabriel Marie Quinio, Moissy-Cramayel (FR); Sabrina Siham Ayat, Moissy-Cramayel (FR); Eric Rouland, Saint-Etienne-Du-Rouvray (FR); Sébastien Yon, Saint-Etienne-Du-Rouvray (FR); Albert Mutabazi, Saint-Etienne-Du-Rouvray (FR)

(73) Assignees: SAFRAN HELICOPTER ENGINES, Bordes (FR); SAFRAN, Paris (FR)

( * ) Notice: Subject to any disclaimer, the term of this patent is extended or adjusted under 35 U.S.C. 154(b) by 471 days.

(21) Appl. No.: 18/042,157

(22) PCT Filed: Aug. 13, 2021

(86) PCT No.: PCT/FR2021/051466
§ 371 (c)(1),
(2) Date: Feb. 17, 2023

(87) PCT Pub. No.: WO2022/038326
PCT Pub. Date: Feb. 24, 2022

(65) Prior Publication Data
US 2023/0318416 A1    Oct. 5, 2023

(30) Foreign Application Priority Data
Aug. 20, 2020 (FR) .................................. 2008583

(51) Int. Cl.
*H02K 15/12* (2025.01)
*H02K 3/34* (2006.01)
(Continued)

(52) U.S. Cl.
CPC ............. *H02K 15/12* (2013.01); *H02K 3/345* (2013.01); *H02K 15/02* (2013.01); *H02K 3/522* (2013.01)

(58) Field of Classification Search
CPC ......... H02K 3/345; H02K 3/522; H02K 15/12
See application file for complete search history.

(56) References Cited

U.S. PATENT DOCUMENTS 9,793,771 B2 * 10/2017 Rabret ................... H02K 15/03
2009/0015094 A1 * 1/2009 Yoshitake .............. H02K 15/12
                                                              310/257

(Continued)

FOREIGN PATENT DOCUMENTS

CN        111181285 A      5/2020
DE     102012020958 A1      4/2014
(Continued)

OTHER PUBLICATIONS

International Search Report and Written Opinion issued in International Application No. PCT/FR2021/051466, mailed on Oct. 4, 2021 (17 pages).

*Primary Examiner* — Gary A Nash
(74) *Attorney, Agent, or Firm* — Bookoff McAndrews, PLLC

(57) ABSTRACT

A method for protecting coils from excessive heating in an aircraft electrical machine comprising a stator and a rotor configured to be rotationally driven with respect to one another, the stator including a plurality of notches receiving one and the same plurality or otherwise of coils, the method including the following successive steps:

(Continued)

inserting an electrical insulator into the notches or onto the teeth of the stator, installing the coils in the notches or on the teeth of the stator, casting a phase change material in the notches or on the teeth equipped with the coils, the electrical insulator forming a casting mold.

20 Claims, 4 Drawing Sheets

(51) Int. Cl.
*H02K 3/52* (2006.01)
*H02K 15/02* (2006.01)

(56) References Cited

U.S. PATENT DOCUMENTS

| | | | |
|---|---|---|---|
| 2009/0102312 A1* | 4/2009 | Tsukashima | H02K 3/522 |
| | | | 310/215 |
| 2018/0083496 A1 | 3/2018 | Honjo | |
| 2020/0131363 A1 | 4/2020 | Wei et al. | |

FOREIGN PATENT DOCUMENTS

| | | | |
|---|---|---|---|
| DE | 102015216374 A1 | 3/2017 | |
| DE | 102016124534 A1 | 6/2017 | |
| DE | 102018102740 A1 * | 8/2019 | H02K 3/345 |
| EP | 2637176 A1 | 9/2013 | |
| FR | 3012698 A1 | 5/2015 | |
| FR | 3019405 A1 * | 10/2015 | H02K 3/522 |
| JP | 2017163666 A * | 9/2017 | |
| WO | 2019227115 A1 | 12/2019 | |

* cited by examiner

[Fig. 1]
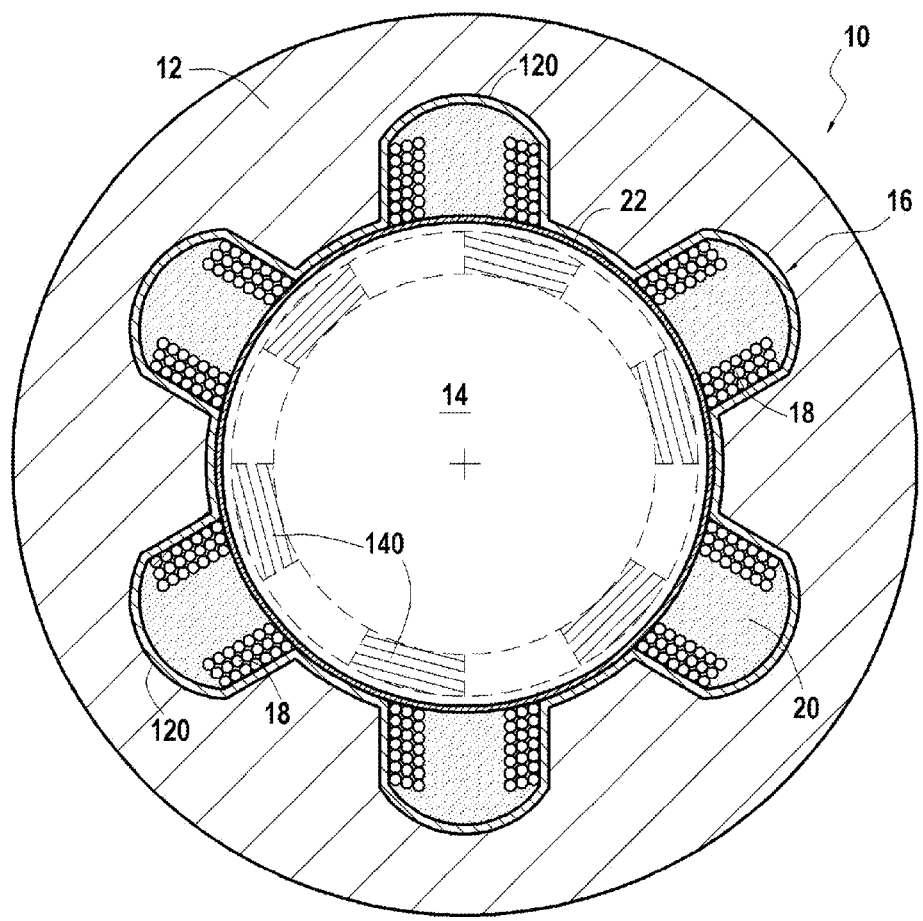

[Fig. 2]
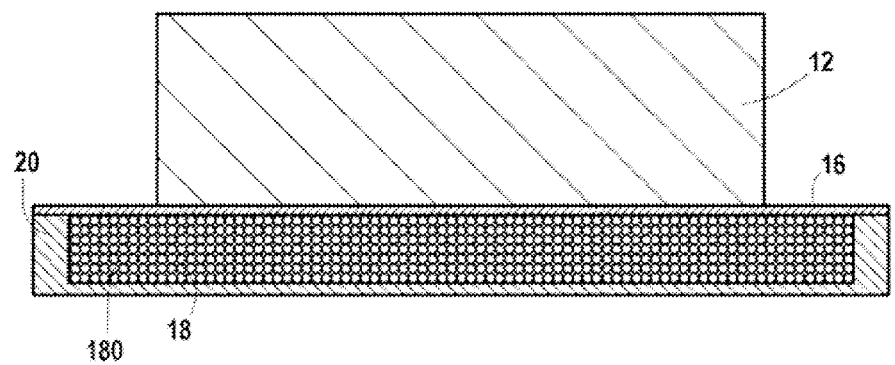
[Fig. 3]
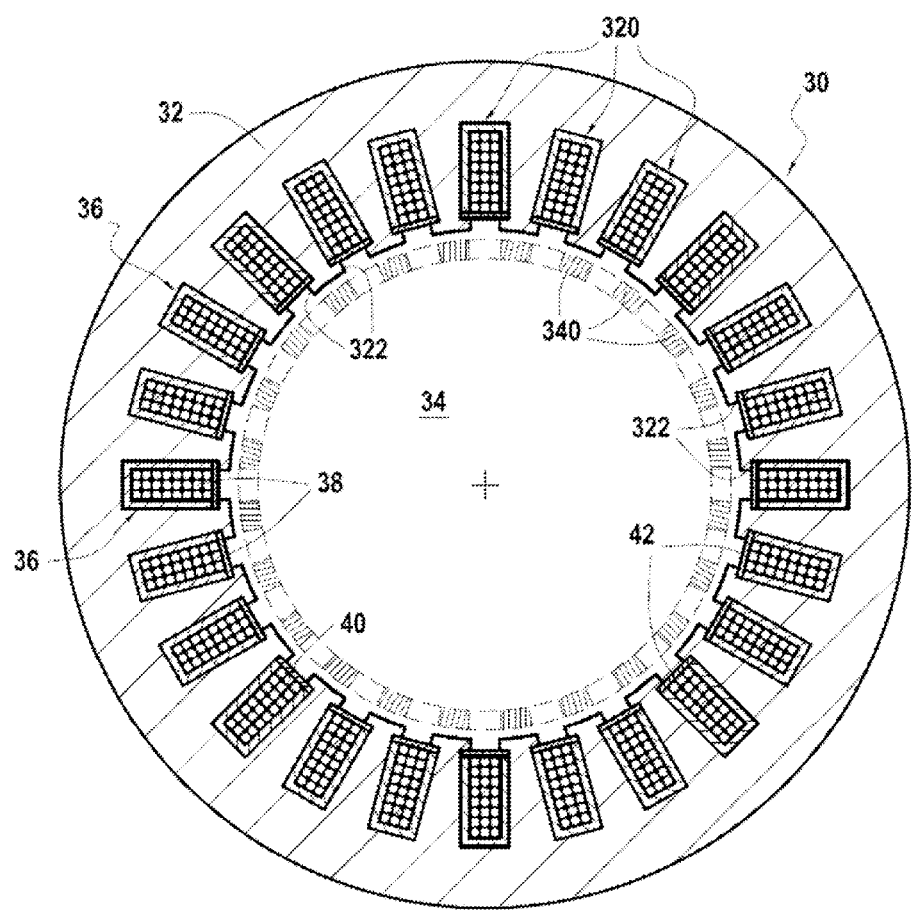

[Fig. 4]
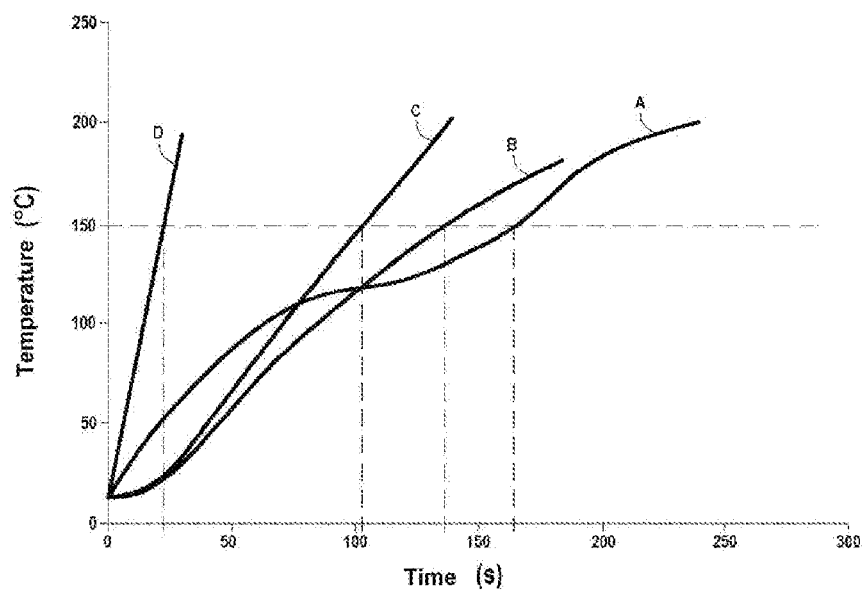
[Fig. 5]
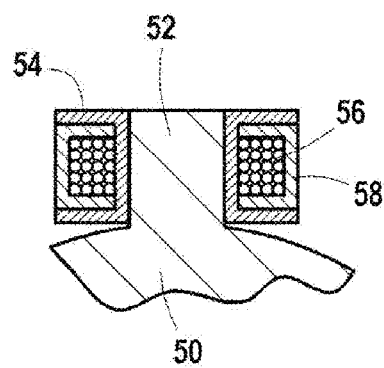

[Fig. 6]
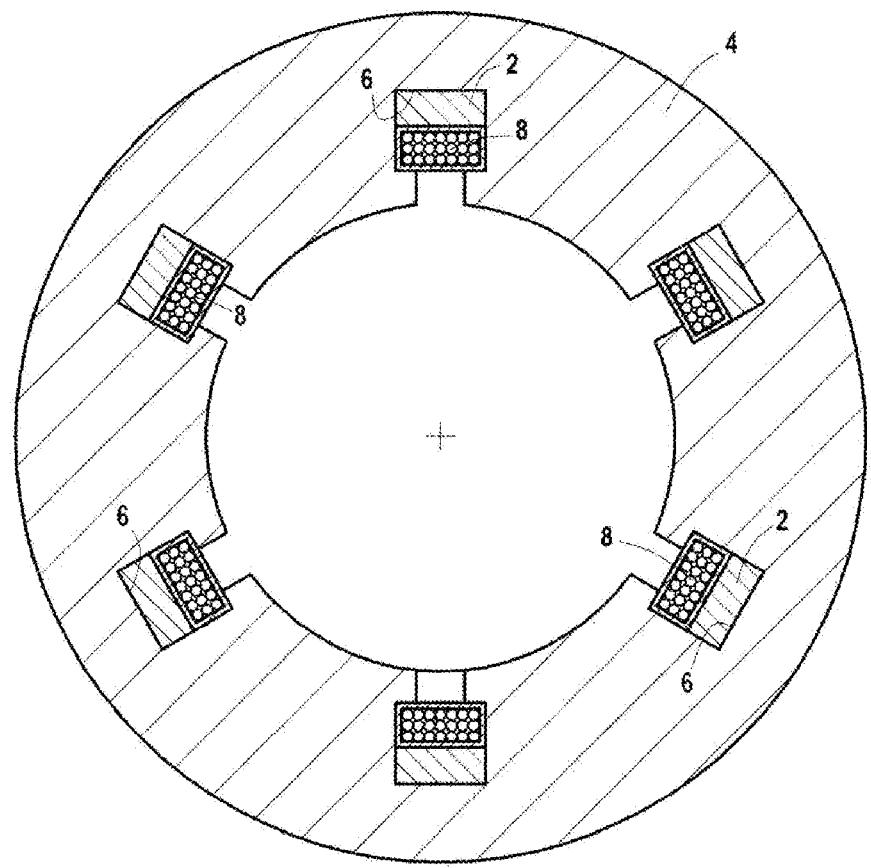
Prior art

AIRCRAFT ELECTRICAL MACHINE WITH IMPROVED HEAT TRANSFER BY MEANS OF A PHASE CHANGE MATERIAL AND ASSOCIATED METHOD

CROSS-REFERENCE TO RELATED APPLICATIONS

This patent application is a continuation is a U.S. National Stage entry of International Application No. PCT/FR2021/051466, filed on Aug. 13, 2021, now published as WO 2022/038326 A1, which claims benefit to French Application No. 2008583, filed on Aug. 20, 2020, the entirety of which is incorporated herein by reference.

TECHNICAL FIELD

The field of the invention is that of DC or AC electrical machines integrated into aircraft engines, in particular those of helicopter or VTOL (Vertical Take Off and Landing) type, allowing the generation and/or motorization of certain electrical members of the aircraft, including electrical propulsion.

PRIOR ART

In the aim of reducing the overall mass of a helicopter propulsion assembly or VTOL, one of the preferred routes is to reduce the mass of electrical generation and/or starting, assistance or else electrical propulsion systems for VTOL. Specifically, the weight of these systems can reach several tens of kilograms for powers not exceeding a few tens of kilowatts, the power-to-mass ratio of the electrical machines rarely exceeding 3 kW/kg.

However, the electrical members to be controlled often operate on a grid voltage of 28 Vdc, whereas power requirements are of several kW or kVA, which gives high-amperage currents of up to several hundreds of amperes, requiring a considerable increase in the cross-section of the copper wires in the electrical machine, this cross-section (in the same way as its structure and its dimensioning in general) being directly related to the amplitude of these currents. More generally the increase in power density per unit mass of these electrical machines involves an increase in current densities while optimizing the on-board mass of copper.

This is why, to keep the assembly at a temperature not exceeding the melting temperatures of the insulators composing the wires of the coil of the electrical machine or to avoid slower degradation of the properties of the insulator, which would lead to the risk of partial discharges, the use of different cooling systems is known, such as natural convection by means of a finned dissipator, forced convection by means of a fan, forced cooling by liquid or by exchanger or else cooling by thermoelectrical module (of Peltier-effect type).

However, in aeronautical applications, i.e. in the context of an on-board system requiring stringent specifications in terms of compactness, mass and reliability, these solutions are not without drawbacks. Natural convection is bulky, heavy and requires an air flow at the periphery of the electrical machine, forced convection is also bulky and moreover has an adverse effect on the reliability of the electrical machine, forced cooling by liquid is similarly bulky, heavy and intrusive to the electrical machine and requires more frequent decommissioning for maintenance, and cooling by thermoelectric module can concern only very localized areas and requires a stabilized power supply allowing thermoelectrical power.

Also, following the observation that the demand for electrical power of an electrical system can be very high, but over times which do not exceed a few tens of seconds or even a minute, signifying a thermal dissipation that is considerable but cyclic or transient, the applicant in her application FR3012698 proposed the use of phase change materials (PCM) to allow better management of heat transfer as close as possible to the critical elements that are the coils of the electrical machine.

As shown in FIG. 6, in order limit temperature peaks within the winding and protect the electrical conductors from AC current losses during high-speed operation (thus at high electrical frequency), these phase change materials 2 are placed in the stator 4 of the electrical machine at the bottom of the notches 6 receiving the windings 8 of the stator coils. Thus, the electromagnetic performances are increased by permitting an increase in the amperage of the electrical current traversing the windings or, for an identical value of electrical current amperage, the cross-section of the wire of the stator coil is reduced and a reduction in the mass of the machine is therefore allowed.

This solution provides satisfaction overall. However, it can still be improved and in particular it is possible to improve the heat transfer properties while reducing the mass and bulk of the electrical machine and this independently of the voltage of the electrical grid.

SUMMARY OF THE INVENTION

This invention therefore proposes to improve the management of heat transfer within an aircraft electrical machine comprising a stator and a rotor configured to be rotationally driven with respect to one another, the stator including a plurality of notches receiving one and the same plurality or otherwise of coils, a method characterized in that it includes the following successive steps:

- inserting an electrical insulator into the notches or onto the teeth of the stator,
- installing the coils in the notches or on the teeth of the stator,
- casting a phase change material in the notches or on the teeth equipped with the coils, the electrical insulator forming a casting mold.

Thus by encapsulating the phase change material in a container formed by the electrical insulator providing the protection of the stator coil, one notably increases the amperage of the current which can traverse the coils without notably modifying the method for manufacturing and configuring the electrical machine, but giving it increased robustness to external aggressions (thermal, dust, water in particular). The encapsulation also ensures good mechanical resistance of the coil, particularly in highly vibrational environments.

When the notches are open and the insulator thus sectorized, the step of casting the phase change material is preceded by a step of inserting a shim or a lock ring to close the notches and thus prevent the casting of the phase change material outside the notches.

Preferably, the electrical insulator, sectorized or not, results from a first cast of a standard resin conventionally used to encapsulate the coils of electrical machines.

According to an advantageous embodiment, the phase change material is previously mixed with a resin of epoxy, polyurethane or silicone type.

The invention also relates to an aircraft electrical machine comprising a stator and a rotor configured to be rotationally driven with respect to one another, the stator including a plurality of notches or of teeth receiving one and the same plurality or otherwise of coils, characterized in that, to protect the coils from excessive heating, it comprises an electrical insulator inserted into the notches or onto the teeth to successively receive said coils and a phase change material for which it forms a casting mold.

Preferably, the electrical insulator and the coil encapsulated in the phase change material can advantageously form an independent module directly insertable onto each of the stator teeth.

According to the envisioned embodiment, said electrical insulator can be formed from a plurality of elements corresponding to the plurality of notches or of teeth, each of the elements thus sectorized being configured to be individually inserted into each of the notches or onto each of the teeth or of a single element adapted to the geometry of the stator and configured to be inserted jointly into all the notches.

Said electrical insulator can be one of the following insulators: paper, mica, polyethylene terephthalate, polyester, or glass fiber, or be obtained by an additive manufacturing method or from a plastic, such as PEEK (PolyEtherEtherKetone) or Polyamide 66 (PA66), having appropriate electrical insulation and thermal resistance features.

Preferably, the phase change material is a nitrate or a hydroxide preferably filled with graphite having a phase change temperature between 150° C. and 300° C.

The invention also relates to an independent module composed of an electrical insulator and coils encapsulated in a phase change material and directly insertable onto each of the teeth of a stator of an electrical machine thus mentioned.

The invention finally relates to an aircraft engine of VTOL or other type, including at least one electrical machine as mentioned above.

BRIEF DESCRIPTION OF THE DRAWINGS

Other features and advantages of this invention will become apparent from the detailed description given below, with reference to the following figures without any limitation and wherein:

FIG. 1 is a first example of an electrical machine in accordance with this invention, FIG. 2 is a radial section view illustrating the encapsulation of the coils at the coil heads machine in accordance with this invention, FIG. 3 is a second example of an electrical machine in accordance with this invention, FIG. 4 shows the variation in temperature according to the percentage of phase change material filling the notches of the stator of FIG. 1.

FIG. 5 shows a part of an internal stator of an electrical machine in accordance with this invention, and FIG. 6 shows a stator of an electrical machine of the prior art.

DESCRIPTION OF THE EMBODIMENTS

A first example of an aircraft electrical machine 10, comprising a stator 12 having a plurality of notches 120 and a rotor 14, for example with permanent magnets 140, the stator and rotor being configured to be rotationally driven with respect to one another, is shown in FIG. 1. In the illustrated example, the stator typically formed from ferromagnetic metal sheets has a concentric coil (also known as toothed) supplied with AC current by a single-phase or multiphase system, typically three-phase (not shown). This coil is known as "Double Layer" since the copper wires are directly wound on each of the teeth of the stator but a so-called "Single Layer" coil where certain teeth are not surrounded with copper wires can of course also be envisioned.

In accordance with an invention, an electrical insulator which, in the illustrated example, is formed from a single element 16, is inserted in one pass jointly into the notches 120 of the stator 12 to successively receive the copper wire coils 18 and a phase change material 20.

This electrical insulator 16 thus forms a casting mold for the phase change material 20 which is prevented from spreading outside the notches 120 by a lock ring 22 which then radially blanks off these notches and therefore closes the mold during the casting. To limit the quantity of air inside the phase change material, making it possible to increase the quantity of materials molded and therefore the quantity of heat that can be extracted therefrom, the impregnation of the coils with liquid PCM will be advantageously done in a vacuum chamber. The lock ring is removed once solidification has occurred to allow the installation of the rotor, but it can also be kept in place in certain specific applications.

To have an optimized shape, adapted to the geometrical limitations of the stator, the electrical insulator will be preferably produced by a known additive manufacturing method (SLA for "Stereo Lithograph Apparatus" or PIM for "Plastic Injection Molding" for example), from a plastic having good electrical insulation and thermal resistance features, such as PEEK (PolyEtherEtherKetone) or Polyamide 66 (PA66).

Specifically and as illustrated in the section of FIG. 2, the coil 18 generally includes at its two ends located outside the notches a number of areas 180 known as "coil heads" which it is also advisable to cover with the mold-forming electrical insulator 16 to provide complete encapsulation of the coil by the phase change material 20 (shown in the solid phase after the liquid casting phase).

The phase change material is preferably a nitrate or a hydroxide ($LiNO_3$, $NaNO_3$, $Li_2CO_3$, etc.) preferably filled with graphite, both chemically neutral and an excellent electrical and thermal conductor, and typically has a phase change temperature between 150° C. and 300° C. It must not be chemically unstable and be neutral in nature to avoid damaging or corroding the copper wires. To guarantee a very significant liquid-solid phase change, the phase change material must have the property of being as congruent as possible and have a very low expansion coefficient.

A second example of an aircraft electrical machine 30, also comprising a stator 32 with a plurality of notches 320 and a rotor 34, for example with permanent magnets 340, is illustrated in FIG. 3. In the example shown, the stator is however of the kind with a distributed coil and it includes lateral flares 322 on the bottom parts of the teeth (the so-called "Tooth Tips"). Note that, in this distributed coil configuration, the number of notches is typically greater than in the previous concentric coil configuration. In another configuration (not shown), the stator can include notches which are completely closed over its entire periphery.

Unlike the first exemplary embodiment, the electrical insulator is no longer formed from a single element but from a plurality of elements 36 corresponding to the plurality of notches, and each individually inserted into a different notch 320 of the stator 32 to successively receive, as previously, the copper wire coils 38 and then a phase change material 40.

Each of the elements 36 forming the electrical insulator thus sectorized constitutes a casting mold for the phase change material 40 which is prevented from spreading outside the notches 320 by a shim 42, supported by the lateral flares 322, which then radially blank off these notches and therefore close the mold again during the casting. The assembly will then advantageously be placed in a vacuum chamber to facilitate the step of impregnation of the phase change material in the liquid state before its solidification during cooling. The shim 42 may be removed once this solidification has occurred or left in place when the nature of its material allows it, for example PEEK (PolyEtherEther-Ketone) or Polyamide 66 (PA66).

Note that in this exemplary embodiment, the insulation of the notches normally present in the stators of an electrical machine is obtained by one of the following insulators: paper, mica, polyethylene terephthalate, polyester, or glass fiber, and can advantageously constitute the mold inside which the phase change material will be cast.

However, this electrical insulator, sectorized or not, covering the walls of the notches can also advantageously come from a first cast of a standard resin conventionally used to encapsulate the coils of electrical machines and suitable for application (epoxy, silicone, polyurethane, or any other usual resin), which will spare the coils and will contain the internal cavity to house the phase change material (PCM). This will of course require a first rigid mold which will be removed once this resin has solidified.

If the text so far has only covered the casting of a phase change material (PCM), it should be noted that it is also envisageable to make a pre-mix of a resin/PCM compound, in liquid form or in solid form in mass proportions determined beforehand by experiments and/or by thermal calculations within the abilities of those skilled in the art, and to pour this mix into the electrical insulator instead and in place of the PCM alone. The resin used for this mixture will typically be of epoxy, polyurethane or silicone type. In this case, it may be useful to place the assembly in a furnace to trigger or speed up the solidification of the resin.

FIG. 4 shows the variation in temperature as a function of the rate of filling of the notches with phase change material, in this case an Erythritol compound. It can therein be seen that for a set limit temperature value (here 150° C.), the use of a mix made of 100% (curve A) or 40% (curve B) phase change material (the other 60% being composed of a single epoxy resin) makes it possible to maintain thermal stress during several more tens of seconds by comparison with the filling of the notches with a single epoxy resin (curve C—0% PCM) or with no filling (curve D).

Thus, by comparison with a standard electrical machine, the invention allows the minimization of the volume and coil mass by approximately 10% of the mass of the electrical machine i.e. approximately 1.2 kg for a machine in the order of 10 kg. It thus avoids any addition of supplementary cooling systems adversely affecting the mass balance, bulk and degree of reliability of the electrical machine. It can be integrated into environments which are transiently very hot (>150° C.).

Of course, the encapsulation of the phase change material in the notches of the stator is also valid for electrical machine topologies with a stator placed inside and a rotor placed outside as shown in FIG. 5 schematically illustrating an internal stator part 50 equipped with a stator tooth 52 onto which is inserted the electrical insulator 54 receiving the coil 56 and serving as mold for the phase change material 58 (shown in the solid phase after the casting phase). Note that the electrical insulator 54 and the coil 56, toothed or concentric, encapsulated in the phase change material 58, can advantageously form an independent module insertable onto each of the stator teeth 52.

Note that the invention also finds an application in asynchronous/induction machines or variable-reluctance machines, such as in axial-flow cylindrical machines and linear-flow discoidal machines.

The invention claimed is:

1. A method for protecting coils from excessive heating in an aircraft electrical machine comprising a stator and a rotor configured to be rotationally driven with respect to one another, the stator including a plurality of notches or of teeth receiving one and the same plurality or otherwise of coils, a method including:
    inserting an electrical insulator into the notches or onto the teeth of the stator,
    installing the coils in the notches or on the teeth of the stator,
    casting a phase change material in the notches or on the teeth equipped with the coils, the electrical insulator forming a casting mold.

2. The method as claimed in claim 1, wherein, when the notches are open and the insulator thus sectorized, casting the phase change material is preceded by inserting a shim or a lock ring to close the notches and thus prevent the casting of the phase change material outside the notches.

3. The method as claimed in claim 2, wherein the electrical insulator, sectorized or not, results from a first cast of a standard resin conventionally used to encapsulate the coils of electrical machines.

4. The method as claimed in claim 2, wherein the phase change material is previously mixed with a resin of epoxy, polyurethane or silicone type.

5. The method as claimed in claim 2, wherein the phase change material is previously mixed with a resin of epoxy, polyurethane or silicone type.

6. The method as claimed in claim 1, wherein the electrical insulator, sectorized or not, results from a first cast of a standard resin conventionally used to encapsulate the coils of electrical machines.

7. The method as claimed in claim 1, wherein the phase change material is previously mixed with a resin of epoxy, polyurethane or silicone type.

8. An aircraft electrical machine comprising a stator and a rotor configured to be rotationally driven with respect to one another, the stator including a plurality of notches or of teeth receiving one and the same plurality or otherwise of coils, wherein, to protect the coils from excessive heating, the machine comprises an electrical insulator inserted into the notches or onto the teeth to successively receive said coils and a phase change material for which it forms a casting mold.

9. The electrical machine as claimed in claim 8, wherein the electrical insulator and the coil encapsulated in the phase change material can advantageously form an independent module directly insertable onto each of the stator teeth.

10. The electrical machine as claimed in claim 9, wherein the phase change material is a nitrate or a hydroxide preferably filled with graphite having a phase change temperature between 150° C. and 300° C.

11. The electrical machine as claimed in claim 8, wherein said electrical insulator is formed from a plurality of elements corresponding to the plurality of notches or of teeth, each of the elements thus sectorized being configured to be individually inserted into each of the notches or onto each of the teeth.

12. The electrical machine as claimed in claim 11, wherein said electrical insulator is one of the following insulators: paper, mica, polyethylene terephthalate, polyester, glass fiber.

13. The electrical machine as claimed in claim 12, wherein the phase change material is a nitrate or a hydroxide preferably filled with graphite having a phase change temperature between 150° C. and 300° C.

14. The electrical machine as claimed in claim 11, wherein said electrical insulator is obtained by an additive manufacturing method or from a plastic, such as PEEK (PolyEtherEtherKetone) or Polyamide 66 (PA66), having appropriate electrical insulation and thermal resistance features.

15. The electrical machine as claimed in claim 11, wherein the phase change material is a nitrate or a hydroxide preferably filled with graphite having a phase change temperature between 150° C. and 300° C.

16. The electrical machine as claimed in claim 8, wherein said electrical insulator is formed from a single element adapted to the geometry of the stator and configured to be inserted jointly into all the notches.

17. The electrical machine as claimed in claim 16, wherein said electrical insulator is obtained by an additive manufacturing method or from a plastic, such as PEEK (PolyEtherEtherKetone) or Polyamide 66 (PA66), having appropriate electrical insulation and thermal resistance features.

18. The electrical machine as claimed in claim 8, wherein the phase change material is a nitrate or a hydroxide preferably filled with graphite having a phase change temperature between 150° C. and 300° C.

19. An independent module composed of an electrical insulator and coils encapsulated in a phase change material and directly insertable onto each of the teeth of a stator of an electrical machine as claimed in claim 8.

20. An aircraft engine including at least one electrical machine as claimed in claim 8.

* * * * *